Dec. 24, 1968   P. J. ZERWES   3,418,420
JUNCTION BOX EXTENSION DEVICE
Filed April 11, 1966   2 Sheets-Sheet 1

INVENTOR
Paul J. Zerwes
BY Silverman & Cass
ATTORNEYS

Dec. 24, 1968  P. J. ZERWES  3,418,420
JUNCTION BOX EXTENSION DEVICE
Filed April 11, 1966  2 Sheets-Sheet 2
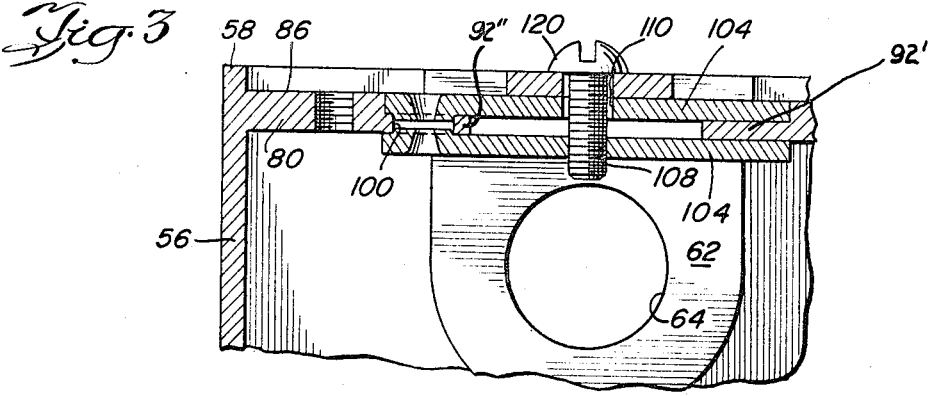
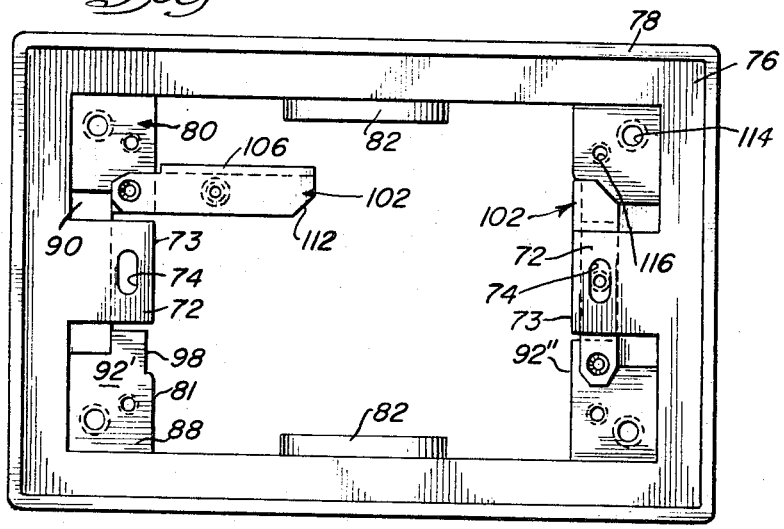
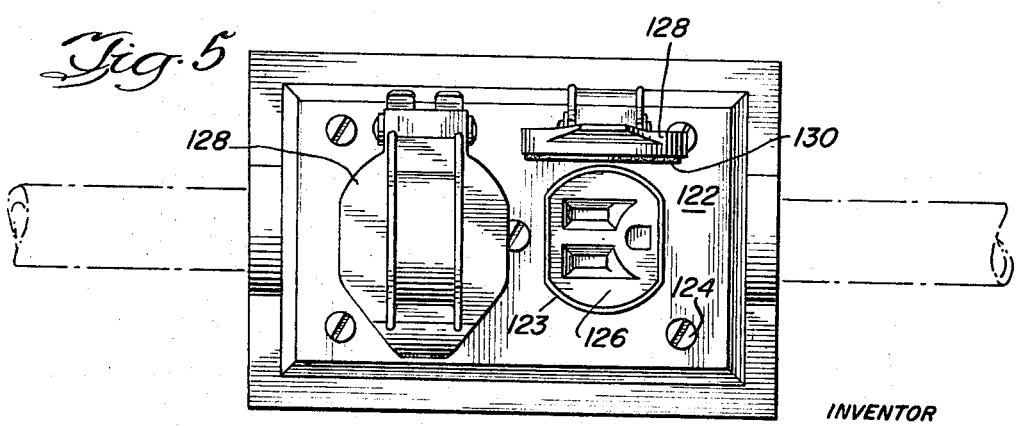
INVENTOR
Paul J. Zerwes
BY
Silverman & Cass
ATTORNEYS

United States Patent Office 3,418,420
Patented Dec. 24, 1968

3,418,420
JUNCTION BOX EXTENSION DEVICE
Paul J. Zerwes, Chicago, Ill., assignor to Bell Electric
Company, Chicago, Ill., a corporation of Illinois
Filed Apr. 11, 1966, Ser. No. 541,757
16 Claims. (Cl. 174—53)

ABSTRACT OF THE DISCLOSURE

An electrical junction box extension device adapted to be fastened to an underlying, pre-existing junction box or the like and formed as a unitary metal frame member having an integral outwardly extending flange formation for overlying the ordinarily rough bordered wall opening for the underlying junction box, the flange formation including a depending portion defining a rectangular seat and having a resilient gasket seated therein retained against lateral outward extrusion as the frame is secured upon the junction box whereby to permit compression of the gasket to seal a direct junction established between the building wall carrying said underlying junction box and the frame; strap means being provided for the securement of an electrical appliance in said extension and swinging clip means formed as a part of said strap means which clip means can be moved aside selectively to permit free access to the underlying junction box for securement of the frame thereto and said clip means carrying tapped openings of standard dimensions required for attachment of the electrical appliance and adatped to be returned to its blocking condition for such attachment.

---

This invention relates generally to so-called electrical junction boxes, and more particularly, concerns a novel junction box extension for converting an ordinary electrical outlet to a weather-proof structure, said extension being characterized further by the provision of novel means for enabling easy installation thereof.

Ordinary junction boxes of the general type concerned herein usually are die-cast metal housings set into building walls for containing the electrical appliances such as switches, receptacles and the like of a building. Such junction boxes are mounted as by nailing same on joists or being supported on thin wall tubing of the type which carry electrical leads therethrough. The junction boxes open to the surface of the building wall and generally are covered by a wall plate attached thereto with openings to give access to the appliance. So-called "take-offs" or electrical connection may be made from the boxes from any direction and from both the interior and exterior sides of the building wall. The invention is concerned primarily with so-called "take-offs" or exterior boxes, for example, to provide outdoor electrical outlets which must be protected against adverse weather conditions and hence, must be weatherproof.

Modern outdoor living trends have created considerable demand for complete weatherproof housings for electrical outlets such as used for pool-side installations, for patios and gardens, at garages and other areas for providing conveniences such as telephone extensions, electrical outlets for lighting, warning systems, music systems, outdoor cooking equipment and for many other equally popular purposes. Rather than bring in special electrical power lines for these special purpose uses, it is more desirable to hock into or take off the power for such uses from the junction boxes already installed in the building.

The building wall may be formed of wood, masonry or plaster. The opening in the building wall for the junction box is often rough hewn, generally larger than required and usually ragged at its edges since care or precision in its formation is not practiced. Loose mortar and gaps between box and wall are present. The junction box opens flush with the building surface and often these ragged gaps surround the box. While normally an ordinary wall plate would mover the opening by overlapping such ragged edges, even with the plate installed, gaps often remain.

In order to "take off" an electrical connection for outdoor use from such already installed junction box, the wall plate must be removed. Thus, there is a considerable problem involved in weather-proofing the take-off connection. It is necessary to compensate for what could be described as sloppy original installation, to cover the surrounding gaps and seal the connection and housing from the outdoor weather elements, and yet to provide the electric "take off." The invention provides such a "take-off" which is quickly and easily made with complete resultant safety and at low cost.

Since take-offs must be made to existing junction boxes and such junction boxes may have many different configurations, the extension must be adaptable for securement to many different types of boxes. In addition, when the ordinary cover plate is removed and replaced by the extension device, means must not only be provided to attach the extension to the underlying box and the appliance to the said box, but the extension must provide means to attach the cover plate thereto. The difficulties are heightened by the realization that the holes provided in the junction box to take the screws used for attachment of the appliance, as well as the matching holes of the appliance are spaced apart a predetermined, standardized distance. The problem now arises in that if standard holes are provided on the extension to match with the standard holes of the junction box, how can the appliance be attached to the extension unless holes, the same distance apart as those of the appliance, would be provided on the extension. In order to provide such holes for attachment of the appliance to the extension, denial of access to the first mentioned set of holes by the structure carrying the second mentioned set of holes is apparent. The invention provides a solution to the above stated problem as will be described below.

An important object of this invention is to provide a junction box extension structure, characterized by the provision of an overlaying flange on the extension to define a seat surrounding the wall opening and a resilient relatively, thick gasket member retained within said seat whereby, when the extension is installed on an existing junction box, the gasket is compressed to force the same against the flange which confines the lateral extrusion thereof so as to seal the junction between the extension and the wall and prevent the entry of moisture or the like thereinto.

Another important object of this invention is to provide a junction box extension of the character described wherein means are provided to enable free access to the interior of the extension to enable fastening thereof to the existing junction box, said means comprising a clip member swingably mounted on a strap formed at the opposite ends of the extension, said clip member being swingable so that access to the underlying junction box may be had for attachment of the extension thereto and said clips each carrying a threaded or tapped opening to receive fastening means and said clip members, arranged to be positioned so that said openings are placed a standardized distance apart for securing an appliance to the extension.

Another further object of this invention is to provide a junction box extension structure which is capable of connection to any known type of junction box of the standardized type used for electrical wiring purposes, said extension structure having lug formations formed integral therewith and provided as an extension of a boss formed thereon in which the threaded sockets are provided for introduction of electrical lead carrying conduit to the housing defined by said extension so that the entire extension can be formed as an integral die casting.

Other objects and advantages of the invention will become evident during the following description of a preferred embodiment thereof with reference to the accompanying drawings.

In the drawings:

FIG. 3 is a fragmentary enlarged sectional view taken along the lines 3—3 of FIG. 1 and in the direction indicated.

FIG. 4 is a bottom view of the junction box extension structure according to the invention.

FIG. 5 is a plan view, on reduced scale, of an installed one gang, two outlet weather-proof electrical receptacle utilizing the junction box extension of the invention, and showing one outlet uncovered for access thereto.

The invention is characterized by the provision of a unitary metal frame member, preferably of die cast construction, capable of being fastened to an underlying pre-existing junction or terminal box and/or flat against a building wall to provide a weatherproof electrical wall box for outdoor use. The invention contemplates means for achieving the weatherproof installation comprising an integral overlapping flange formation on the frame for overlying the ordinarily rough wall opening for the junction box, terminal box and the like. The flange formation forms a rectangular seat to accommodate and contain a resilient gasket against lateral extrusion as the frame is secured upon the said junction box to permit compression of the gasket to seal the junction between the building wall of the building and the frame, covering any breakage, jagged edges, loose mortar and the like surrounding the opening.

The invention further is characterized by the provision of swinging clip means which are engaged at points where same can be moved aside to permit free access to the underlying junction box for securement of the frame thereto, and which carry tapped openings of standard dimensions required for attachment of the electrical appliance.

Figure 1:
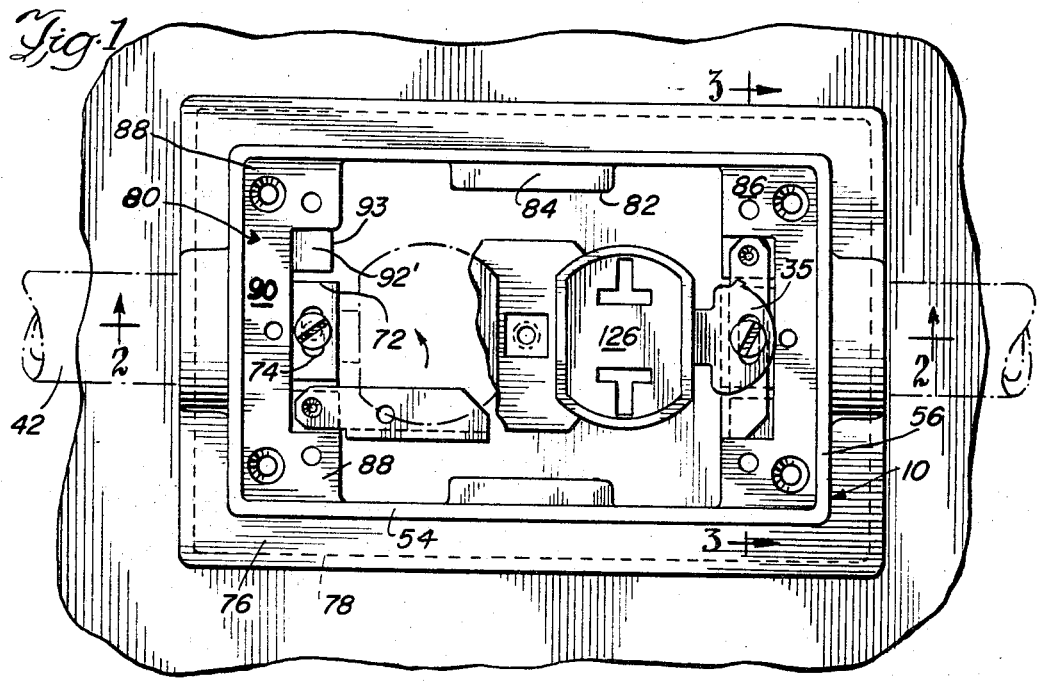
FIG. 1 is a top plan view of wall mounted junction box having the junction box extension of the invention installed thereon and mounting an electrical appliance.
Figure 2:
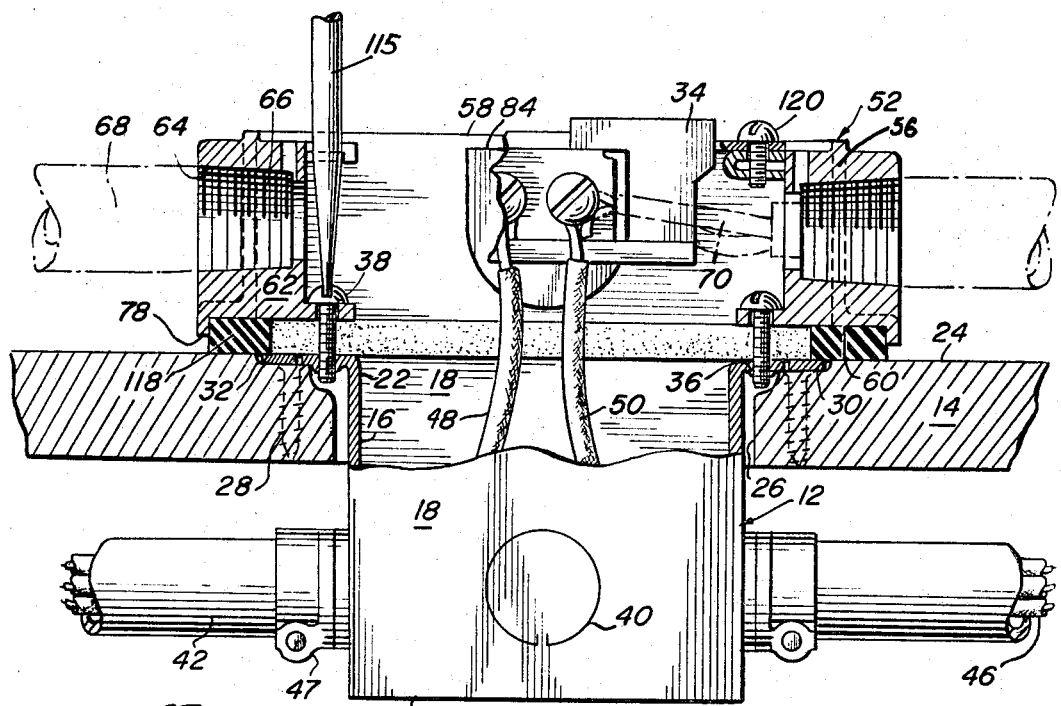
FIG. 2 is a sectional view taken along the lines 2—2 of FIG. 1 and in the direction indicated (same in untightened condition).

Referring to the drawings, in FIG. 2, reference character 12 generally designates a rectangular metal junction box of known construction installed on a building wall 14 which may be of plaster, wood, masonry or other suitable building material. Junction box 12 is formed ordinarily by stamping or may be a cast member, and has end walls 16, side walls 18 and a bridging wall 20 (which may be termed a bottom wall as illustrated). The abutting edges of the walls are swaged, staked or otherwise secured to provide a rectangular housing or enclosure 22 opening toward the outer surface 24 of building wall 14.

An opening 26 is formed in the wall 14 and is almost always slightly larger than necessary to accommodate the box 12. In FIG. 2, the box 12 is illustrated installed on the wall 14 by fastening means, such as screws 28, passed through suitable openings 30 formed on integral flanges 32 provided on opposite end walls 16 of box 12. When installed, the box 12 opens generally flush with the wall surface 24.

Although not specifically shown in the drawing, the junction box 12 normally mounts electrical appliances such as electrical receptacle 34, switches and the like. Such appliances are usually provided with tongue extensions, such as tongues 35. Flanges 32 are provided with threaded openings 36 to accommodate screws 38 which will pass through similar threaded openings formed in the tongues 35 when same are aligned therewith to enable attachment of the appliance to the box 12. Ordinarily, a conventional plate, such a wall plate (not shown), is secured to the junction box to conceal the box and appliance but enable access to the appliance. Well known wall switches and electrical receptacle typify these installations.

Suitable knock-out slugs 40 are provided in the junction box walls to provide openings through which thin wall hollow tubing 42 may be mounted and fixed in position as by clamp assembly 47. Electrical conductors 46 are threaded through such tubing into the junction box 12 where the electrical connections to the appliance are made. In FIG. 2, a pair of such conductors 48 and 50, are shown being drawn through the open portion of the box 12.

Up to now, there has been described an ordinary junction box, commonly known as a gem box. Such boxes as well as those known as "handy" or "universal" boxes are used to back up the electrical appliances such as found in a building, for example. It often is desired to provide additional extensions or take-offs such as for increasingly utilized outdoor uses, i.e. outdoor cooking equipment, telephone jacks, lighting, etc., or simply to take off electrical leads by means of conduits from an interior junction box. The invention is concerned with such so called "take-off extenders" and provides an extension structure designated generally by reference character 10 in the drawings. The purpose of the extension 10 is to provide a larger housing for the new electrical appliance or, more frequently, to provide a housing for the new electrical leads and appliances and their electrical connection to the interior located electrical leads, say, leads 48 and 50. Although some form of extension devices are known, none result in weatherproofed installation and substantial difficult is encountered in mounting the same to the wall 14 or to the existing, underlying junction box 12 mounted in the opening 26 formed in wall 14. The structure of the invention provides a solution to the problem of easy mounting and, even more important, provides means for weatherproofing the "take-off" installation.

Junction box extension 10, which is sometimes referred to herein as an extender or "take-off" extender, is a unitary metal frame member 52 formed by casting and of rectangular configuration having side walls 54 and end walls 56. For the purposes of this description, the outermost edge of the frame 52 when installed, shall be referred to as the top edge 58 and the edge closest to the wall surface 24 shall be referred as the bottom edge 60. Each of the end walls 56 is provided with an interior boss 62 integral therewith and each boss 62 has a threaded passageway 64 to accommodate the ends 66 of hollow electrical conduit 68 formed as thin wall tubing for carrying the electrical leads 70 to and from the interior of the extender 10. An integral lug member 72 having a slot 74 formed therein extends inward from each boss 62 a predetermined distance so that the distance between opposite slots 74 is equal to the standardized distance between threaded openings 36 of flanges 32 when the extension 10 is positioned over the open end of box 12. The lug members 72 have their undersurfaces coplanar with the bottom edges 60 of extender 10 and are of thickness sufficient to afford a good mechanical support for the fastening means used to attach extension 10 to underlying box 12.

A portion of each boss 62 extends outward from its respective end wall 56 so as to provide better support for the electrical conduits 68. The bottom edge 60 of the extender 10 is provided with an integral outwardly extending, surrounding framing flange 76, same being arranged to extend substantially normal to the walls 54 and 56 of extender 10. The framing flange 76 has a horizontal width substantially equal to the distance each boss 62 extends from the respective wall 56. Framing flange 76 terminates along its length in an integral vertically arranged bend 78 extending normal to flange 76 to form a rectangular seat entirely around the bottom edge 60 of extender 10. A rectangular resilient framing gasket 118 of electrical insulating material, preferably rubber, is disposed in said seat, said gasket being thicker than the width of bend 78. Thus the gasket 118 may be compressed without being reduced in thickness to the effect that same is less than the bend 78 width. The width of framing flange 76 is chosen to enable it to overlap the defining edges of opening 26 formed in the building wall. As stated above, opening 26 usually is found to be much larger than would be required and are often rough hewn, leaving broken masonry, jagged edges and gaps between the box 12 and the wall 14. The framing flange 76 extends over these roughened peripheral edges to rest against the building wall.

Continuing with the description of the structure of the extender 10, a pair of opposite strap formations 80 are formed integral with and extending inwardly of end walls 56. The strap formations 80 extend across the end portions of box 12 from side wall to side wall. The strap formations 80 are spaced slightly from top edge 58 of extender 10 and each formation 80 occupies a common horizontal plane. Said strap formations 80 are of a width to enable the inner edge 81 thereof to align with the inner edge 83 of lug members 72 and are parallel thereto. Strap formations 80 are integral also with side walls 54 of the extender 10. Opposite, inwardly facing integral bosses 82 are provided on side walls 54 and are arranged whereby the upper surfaces 84 thereof provide a shoulder coplanar with the upper surface 86 of the strap formations 80. Each of the strap formations 80 carry openings for the attachment of wall plates or other appliances thereto. Thus, a wall plate or gasket, as the case may be, may be supported on said surfaces 84 and 86.

Strap formations 80 each have a cut-out portion dividing the stray formations into portions herein referred to as corner portions 88 and bridging portions 90, with the bridging portions 90, of course, being of lesser width than the corner portions 88. A pair of integral thin tabs generally designated by reference character 92 is provided, one at each junction between the corner portions 88 and bridging portions 90. Tabs 92 are less in thickness than strap formations 80 and have their undersurfaces coplanar with undersurfaces 94 of strap formations 80 so that a shoulder formation 96 results. Diagonally opposite ones of said tabs 92, namely tabs 92', have an edge portion removed as shown at 93 so that the inwardly facing edge 98 thereof is off-set from the inwardly facing edge 81 of the adjacent corner portion 88 of strap formation 80. The opposite tabs, namely 92", have an opening 100 formed therein, said opening adapted to mount a movable clip member, generally designated 102, for swinging movement in a horizontal plane parallel to the plane occupied by surfaces 84 and 86.

Each clip 102 is formed as pair of flat plates 104 of a length chosen substantially equal to the distance between the inner edges of corner portions 88, and a width chosen substantially slightly less than the width of tabs 92. The pair of plates 104 are joined by fold 106 of a length chosen to be less than the length of plates 104 by an amount substantially equal to the width of tabs 92". The clip 102 preferably is formed of a unitary sheet metal member bent to shape with plates 104 superposed and spaced apart by fold 106 at a distance slightly greater than the thickness of tabs 92. The clips 102 are mounted to their respective tabs 92" by staking or otherwise to form a pivotal connection. A tapped opening 108 is provided in one plate 104 of clip 102, aligned with a smooth hole 110 formed in the other plate 104. The threaded opening 108 usually is formed in the lower reverse bent plate 104, and is adapted to receive the screws used to attach the appliance to the extension when opening 108 and hole 110 are aligned with openings 74 and 36. The opening 110 is provided to guide the screw without interference. End portions 112 of each clip may be diagonally severed to provide a finger opening which enables easier swinging of the clip 102 for purposes to be described.

The clips 102 are swingable between a first position wherein the corner portions 88 extend parallel to the bridging portion 90, blocking off access to the slots 74, and a second position uncovering slots 74 to provide access thereto, say by a screw driver. In the first position the tabs 92' are received between plates 104, and hence the clips 102 are well supported. Holes 114 and/or tapped passageways 116 are provided in the strap formations 80. Tapped passageways 116 are utilized for attachment of covering plates, such as plate 122 in FIG. 5, to the extension 10.

Attention now will be directed to the installation of the junction box extension structure 10 so that the advantages of said structure can be easily appreciated. As stated above, the appliance which was installed in the underlying junction box 12 has been removed and leads 48 and 50 drawn outward therefrom. The clips 102 are swung inwardly of the extension, enabling access to the lugs 72 by a screw driver, such as represented by reference character 115. The flat rectangular resilient gasket 118, preferably of electrical insulating material such as rubber, is disposed in the rectangular seat defined by framing flange 76. The extender 10 is now arranged to cover the opening 26 with the slots 74 aligned with openings 36. Using the screw driver 115, the screws 38 are inserted through the pairs of aligned openings 74 and 36 and tightened. In tightening, the gasket 118 is squeezed down against the wall and edges of the junction box 12 but lateral extrusion of the gasket is blocked or confined by the bend 78. Thus, when the screws 38 are tightened, a weatherproof seal is formed between the wall 14 and the extension 10.

After installation, the clips 102 are returned to their bridging position, and openings or holes 108 and 110 aligned with slots 74 of lugs 72. Now the appliance 34 is ready to be attached to the extension 10 by means of, say, screws 120.

The completed installation is illustrated in FIG. 5 wherein the weatherproofing is completed by securing plate member 122 to the extension 10 by screws 124 which are received in the threaded holes 116. The location of holes 116 in formations 80 are chosen so that they will align with the appropriate standardized holes in the cover plate. While the installation shown in FIG. 5 is one of a one gang junction box having the extension attached thereto, the invention is as useful with other common forms of junction box such as the two gang embodiment with minor changes in relative size of the extension. Of course the standardized distance between opposite slots, such as slots 72 would remain the same, since the equivalent distance found in the underlying junction boxes and the electrical appliances are likewise standardized.

The cover plate 122 rests on a thin rubber gasket 123 which rests on surfaces 84 and 86. Said gasket 123 is provided with standardized openings which coincide with the screw openings 116 of the extension and those portions of the appliance 34 to which access is desired, say plug receptacles 126. The cover plate 122 of FIG. 5 carries a pair of hingedly connected, spring biased, cover plates 128 to protect each of the plug receptacles from the exterior. In order to gain access to, say, plug receptacle 126, the cover plate 128 must be lifted against its bias as shown in FIG. 5 (right side thereof). Each of said cover plates 128 carry appropriate thin rubber gaskets 130 to complete the weatherproofed installation.

It should be noted that while the installation illustrated herein shows the junction box extension 10 secured to the underlying junction box 12, the said extension may, as well, be attached directly to the wall 14 by long screws (not shown) passing through the smooth holes 114 provided on strap formations 80. Moreover, the installation of the extension 10 directly to the wall by means of screws passed through said holes 114 even without connection through slots 74 of lugs 72 is also feasible should such installation be desired.

Variations are capable of being made without departing from the spirit or scope of the invention as defined in the claims appended hereto.

What I claim is:

1. An electrical junction box defining a housing for receiving an electrical appliance therein comprising, a unitary frame member having at least a pair of opposite vertical wall portions defining top and bottom edges, a pair of lug formations each integral with opposite ones of said wall portions and extending along a common horizontal plane inward of said opposite wall portions a predetermined distance, each lug formation having means for securing the frame to an object, an integral flange formation surrounding said frame and extending outward thereof, said flange formation having a continuous portion defining a seat and a resilient gasket member disposed within said seat, the said flange formation retaining said gasket against lateral extrusion upon securement of said frame to said object whereby to seal the junction of object and frame, and means on said frame member for mounting an electrical appliance thereto, said means having a pivotally connected portion normally disposed blocking access to said lug means and being selectively movable to establish access to said lug means and for return to its normal disposition.

2. An electrical junction box extension adapted to be secured over an opening in a building wall housing an electrical junction box of the type having standard appliance receiving openings formed thereon at opposite ends thereof; said extension comprising a frame member having opposite wall portions and adapted to be disposed over the electrical junction box, said opposite wall portions having lug means integral therewith and extending inwardly thereof, said lug means carrying openings formed therein for superposition over the standard openings of the underlying junction box adapted to receive fastening means therethrough for securement to the box, a framing flange formation integral with the frame along the entire length thereof, said formation having a horizontal portion overlapping the wall opening with a depending portion along the free edge of the horizontal portion, said portions together defining a gasket seat opening toward the building wall and a resilient gasket seated in said seat and of a thickness sufficient to extend outward thereof, said depending portion confining the gasket against lateral extrusion when the frame is secured to the underlying junction box to compress the gasket thereby to form a sealed connection between the frame and the building wall and strap means is provided across the outer portion of the frame, said strap means carrying the passageways for fastening objects thereto, said strap means having plate portions thereof normally blocking access to said lug means, each said plate portion carrying a tapped opening for securement of an electrical appliance thereto and said tapped opening being aligned with the openings of said lug means, said plate portions pivotally mounted to said strap means for horizontal swinging movement to provide access to said passageways for securement of said extension to said junction box and being returnable to mount the appliance thereon.

3. An electrical junction box defining a housing for receiving an electrical appliance therein comprising, a unitary frame member having at least a pair of opposite vertical wall portions defining top and bottom edges, a pair of lug formations each integral with opposite ones of said vertical wall portions and extending along a common horizontal plane inward of said opposite vertical wall portions a predetermined distance, each lug formation having means for securing the frame to an object, an integral flange formation surrounding said frame and extending outward thereof, said flange formation having a continuous portion defining a seat and a resilient gasket member disposed within said seat, the said flange formation retaining said gasket against lateral extrusion upon securement of said frame to said object whereby to seal the junction of object and frame, and a strap formation is formed at said opposite wall portions across the top thereof, said strap formation including pivotally supported clip means arranged in a plane parallel to said lugs blocking access thereto from the top edge of said frame, said clip means carrying a tapped opening for attachment of an electrical appliance thereto and adapted to be swingable relative to said frame to provide access to said lug formations for securement of the frame on said object and subsequently, to be returned to provide means to mount the electrical appliance thereto.

4. An electrical junction box as claimed in claim 3 in which said clip is formed as a pair of plates superposed one spaced from the other and joined along a fold, said plates being mounted to said strap formation for horizontal pivotal movement relative thereto.

5. An electrical junction box as claimed in claim 4 in which the upper and lower plates have aligned openings and the lower plate opening is threaded.

6. An electrical junction box as claimed in claim 5 in which the frame is of rectangular configuration and a boss is provided integral with each said wall portion, said lug formations being parallel to said boss and said boss extending through said wall portions on both sides thereof and having a passage therethrough to receive electrical conductors, said framing flange being coterminous with said boss on the exterior of said frame.

7. An electrical junction box extension adapted to be secured to an underlying standardized junction box mounted in a building wall, said extension having opposite end walls defining an upper and lower open face, means for securing the extension to said box being integral with said end walls at the lower face and arranged to be matched with means provided on said junction box, strap means disposed across the upper face of said extension blocking access to said securing means, and said strap means including swingably mounted clip means carrying openings arranged to be spaced a standardized distance apart for securement of an electrical appliance thereto, said clip means being arranged for swinging movement away from their normal blocking position to enable access to said securing means.

8. An electrical junction box extension as claimed in claim 7 in which said extension is a frame of rectangular configuration.

9. An electrical junction box extension as claimed in claim 7 in which said extension and the underlying junction box are of complementary configuration with the frame being larger than the underlying junction box.

10. The electrical junction box extension as claimed in claim 7 in which said extension has an integral outwardly extending flange portion surrounding same and adapted to overlap the building wall around the underlying electrical junction box.

11. The electrical junction box extension as claimed in claim 10 in which said flange portion defines a seat opening towards the building wall and adapted to have resilient gasket means disposed therein, said extension being secured to the underlying junction box with said gasket means compressed within said seat.

12. An electrical junction box extension device for attachment to a building wall to provide an outdoor housing for an electrical appliance comprising, a frame member defining an open front and rear face relative to the wall, lug means extending inwardly of said frame for securing the same over the building wall, and a rotatably mounted member arranged normally inwardly of the frame to block access to said lug means and selectively movable to provide access to said lug means, said rotatably mounted member carrying a tapped hole for attachment of the electrical appliance thereto.

13. The structure as claimed in claim 12 wherein strap means are provided across the front face of said frame and said rotatably mounted member is mounted to said strap means.

14. The structure as claimed in claim 12 in which said extension is formed as a unitary metal casting except for said rotatably mounted members.

15. The structure as claimed in claim 12 in which said frame has an integral flange formation arranged to be disposed over the building wall and defining a seat opening to the rear open face of said frame, and a resilient gasket of thickness greater than the depth of the seat disposed therewithin, said gasket being compressible upon installation of the frame for weather tight sealing between the frame and the building wall.

16. The structure as claimed in claim 15 in which said gasket is formed of electrical insulating material.

References Cited
UNITED STATES PATENTS

| | | | |
|---|---|---|---|
| 2,964,882 | 12/1960 | Hudson | 174—48 X |
| 3,197,548 | 7/1965 | Weitzman et al. | 174—65 X |
| 3,303,264 | 2/1967 | Saul et al. | 220—3.3 X |

LEWIS H. MYERS, *Primary Examiner.*

DAVID A. TONE, *Assistant Examiner.*